(12) United States Patent
Paluch et al.

(10) Patent No.: US 12,445,460 B2
(45) Date of Patent: Oct. 14, 2025

(54) TRACKING A POTENTIAL ATTACKER ON AN EXTERNAL COMPUTER SYSTEM (71) Applicant: INTERNATIONAL BUSINESS MACHINES CORPORATION, Armonk, NY (US)

(72) Inventors: Michal Paluch, Cracow (PL); Szymon Kowalczyk, Cracow (PL); Jiri Grunseisen, Brno (CZ); Marcel Butucea Panait, Brno (CZ)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 17/457,467

(22) Filed: Dec. 3, 2021

(65) Prior Publication Data
US 2023/0179606 A1 Jun. 8, 2023

(51) Int. Cl.
*H04L 9/40* (2022.01)
*G06N 3/042* (2023.01)

(52) U.S. Cl.
CPC ......... *H04L 63/1416* (2013.01); *G06N 3/042* (2023.01); *H04L 63/1425* (2013.01); *H04L 63/1491* (2013.01)

(58) Field of Classification Search
CPC ................ H04L 63/14–1491; G06N 3/042
See application file for complete search history.

(56) References Cited

U.S. PATENT DOCUMENTS

| 8,775,333 B1 * | 7/2014 | Zahn ..................... G06F 21/552 706/12 |
| 10,419,450 B2 | 9/2019 | Muddu |

(Continued)

FOREIGN PATENT DOCUMENTS

| CN | 112003842 A | * 11/2020 | ......... G06F 9/45558 |
| CN | 118355382 A |   7/2024 | |

(Continued)

OTHER PUBLICATIONS

Foreign Office Action, Application No. 111133100, dated Apr. 18, 2023, 27 pages.

(Continued)

*Primary Examiner* — Madhuri R Herzog
(74) *Attorney, Agent, or Firm* — Yee & Associates, P.C.

(57) ABSTRACT

A computer-implemented method obtains information about an external computer system having a connection to a computer system. The method may comprise receiving a request from the external computer system. In response to categorizing the external computer system as a potential threat responsive to the request, a computer file is generated responsive to the request. The computer file comprises instructions which are designed for obtaining the information about the external computer system if the instructions are executed on a processor of the external computer system. Furthermore, data is provided responsive to the request. The data is sent together with the computer file to the external computer system. The information about the external computer system, which is generated responsive to the instructions of the computer file, is received by the computer system for preserving it for a later use for developing measures for protecting the computer system.

20 Claims, 4 Drawing Sheets

(56) References Cited

U.S. PATENT DOCUMENTS

| | | |
|---|---|---|
| 10,447,738 B2 | 10/2019 | Joseph |
| 10,560,434 B2 | 2/2020 | Bingham |
| 10,609,074 B2 | 3/2020 | Venu |
| 10,721,269 B1* | 7/2020 | Talmor .................. H04L 67/02 |
| 10,735,382 B2* | 8/2020 | Kuperman .......... H04L 63/1416 |
| 11,445,003 B1* | 9/2022 | Katta ................. H04L 63/0236 |
| 2011/0093703 A1* | 4/2011 | Etchegoyen ............ G06F 21/57 |
| | | 713/168 |
| 2014/0201836 A1 | 7/2014 | Amsler |
| 2014/0283061 A1 | 9/2014 | Quinlan |
| 2015/0095981 A1* | 4/2015 | Adams ................. G06F 21/554 |
| | | 726/3 |
| 2015/0193631 A1* | 7/2015 | Adams .................. G06F 21/62 |
| | | 726/30 |
| 2017/0012960 A1* | 1/2017 | Idika ...................... G06F 21/55 |
| 2019/0114417 A1* | 4/2019 | Subbarayan .......... H04L 41/145 |
| 2019/0124095 A1 | 4/2019 | Yadav |
| 2020/0366700 A1* | 11/2020 | Prokop ................. G06Q 50/265 |
| 2021/0049451 A1* | 2/2021 | Wang ...................... H04W 4/06 |
| 2021/0067553 A1 | 3/2021 | Ries |

FOREIGN PATENT DOCUMENTS

| | | |
|---|---|---|
| EP | 2779574 A1 | 9/2014 |
| EP | 4441644 A1 | 10/2024 |
| TW | 811087 B | 8/2023 |
| WO | 2009032379 A1 | 3/2009 |
| WO | 2020005567 A1 | 1/2020 |
| WO | 2023099135 A1 | 6/2023 |

OTHER PUBLICATIONS

Patent Cooperation Treaty, Notification of Transmittal of the International Search Report and the Written Opinion of the International Searching Authority, Date of Mailing Feb. 27, 2023, International Application No. PCT/EP2022/081209, 10 pages.

* cited by examiner

TRACKING A POTENTIAL ATTACKER ON AN EXTERNAL COMPUTER SYSTEM

BACKGROUND

The disclosure relates in general to the field of intrusion detection systems and, in particular, to a method for obtaining information about an external computer system after having categorized the external computer system as a threat to a computer system.

Intrusion detection systems may try to detect a potential attacker by comparing an actual request of the attacker directed to the protected system with a request database. The request database may comprise information about requests of other attackers directed to the protected system. Those other attackers may have intruded the protected system before the actual attacker.

SUMMARY

Various embodiments provide a computer system for obtaining information about an external computer system and a method as described by the subject matter of the independent claims. Advantageous embodiments are described in the dependent claims. Embodiments of the present disclosure can be freely combined with each other if they are not mutually exclusive.

In one aspect, the disclosure includes a computer-implemented method for obtaining information about an external computer system having a connection to a computer system, the method comprising:
  receiving a request from the external computer system via the connection;
  categorizing the external computer system as a potential threat to the computer system;
  in response to categorizing the external computer system as the potential threat, generating a computer file dependent on the request, the computer file comprising instructions, wherein the instructions are designed for obtaining the information about the external computer system if the instructions are executed on a processor of the external computer system;
  providing data dependent on the request;
  sending the data together with the computer file to the external computer system;
  receiving the information about the external computer system generated dependent on the instructions of the computer file;
  preserving the information about the external computer system within the computer system for providing the information about the external computer system for developing a measure for protecting the computer system.

In another aspect, the disclosure includes a computer program product for an intrusion detection system for a computer system, the computer program product comprising one or more computer-readable storage media, and program instructions collectively stored on the one or more computer-readable storage media, the program instructions comprising:
  program instructions to receive a request from an external computer system via a connection;
  program instructions to categorize the external computer system as a potential threat to the computer system dependent on the request;
  program instructions to generate a computer file dependent on the request in response to categorizing the external computer system as the potential threat, the computer file comprising instructions, wherein the instructions are designed for obtaining the information about the external computer system if the instructions are executed on a processor of the external computer system;
  program instructions to provide data dependent on the request;
  program instructions to send the data together with the computer file to the external computer system;
  program instructions to receive the information about the external computer system generated dependent on the instructions of the computer file;
  program instructions to store the information about the external computer system in a database for providing the information about the external computer system for developing a measure for protecting the computer system.

In another aspect, the disclosure includes an intrusion detection system for a computer system, the intrusion detection system being configured for:
  receiving a request from an external computer system via a connection;
  categorizing the external computer system as a potential threat to the computer system;
  in response to categorizing the external computer system as the potential threat, generating a computer file dependent on the request, the computer file comprising instructions, wherein the instructions are designed for obtaining the information about the external computer system if the instructions are executed on a processor of the external computer system;
  providing data dependent on the request;
  sending the data together with the computer file to the external computer system;
  receiving the information about the external computer system generated dependent on the instructions of the computer file;
  preserving the information about the external computer system within the computer system for providing the information about the external computer system for developing a measure for protecting the computer system.

BRIEF DESCRIPTION OF THE DRAWINGS

In the following, embodiments of the disclosure are explained in greater detail, by way of example only, making reference to the drawings in which.

DETAILED DESCRIPTION

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The computer system in some embodiments may be a personal computer system, a server computer system, a microprocessor-based system, or a programmable consumer electronic, such as a mobile phone or a network PC, for example. In one example, the computer system may be a network of several computing devices, such as several servers. According to a further example, the computer system may be a standalone computer only being connected to the external computer system.

The request may be generated by the external computer system (hereinafter, also referred to as the external system). The request may be an HTTP-request, such as the HTTP-request "GET" or "HEAD". For example, the external computer system may execute web browser software for displaying a webpage for a user of the external computer system. The webpage may be hosted on a webserver of the computer system. The HTTP-request may be generated dependent on input data created by the user.

The input data may describe, and may be produced in response to, an action of the user. The action of the user may comprise checking a box of the webpage, entering a text in a text field of the webpage, etc. Hence, the input data may be received in the form of electronic signals generated by a keyboard or a mouse of the external system. According to one example, the external system may execute an automation script that may generate the input data automatically by imitating the user.

The request may comprise information for specifying the data, for example a filename, a hyperlink, a name of a requested table, a column number of the table and/or a row number of the table.

The external system may display, such as by executing the web browser, an updated version of the webpage dependent on the data sent together with computer file. As the data is provided dependent on the request, the request may be described as a request for the data. The data may comprise data for displaying graphics, for example for displaying a login screen. Furthermore, the data may comprise confidential data, (e.g., data of a payroll system of the computer system) and/or non-confidential data (e.g., an erroneous version of the confidential data). In some embodiments, the data may be designed such that the updated version of the webpage may be displayed dependent on the data. In some embodiments, the updated version of the webpage may comprise the data.

The computer system may provide the data dependent on the information for specifying the data. For example, a processor of the computer system may read in the data from a storage of the computer system and send the data to an interface of the computer system. The storage may be a storage of a database server or a decoy server. According to one example, the computer system may generate the data dependent on the request.

The connection between the external system and the computer system may be provided via the internet, the interface of the computer system, and an interface of the external system. In one example, the interface of the computer system may be indirectly connected to the interface of the external system via a proxy server.

The computer system may perform the categorizing of the external system as the potential threat dependent on a recorded data traffic between the external system and the computer system. The recorded data traffic may comprise the request. In one example, the computer system may categorize the external system as the potential threat dependent on the request using a request database. The request database may store profiles of requests that were categorized as attacks against the computer system in the past. In one example, the computer system may perform the categorizing of the external system as the potential threat dependent on a history of requests that were performed by the external system. The history of requests may include several past requests and the aforementioned request. The history of requests may comprise several, for example ten, requests for displaying a login page. Analogously, the history of requests may comprise performing several attempts of logging into a protected section of a web service of the computer system.

In some embodiments, the computer system may generate the computer file dependent on the request such that the computer file may comprise the data which is requested by responsive to the request. Thus, in some embodiments, the sending of the data together with the computer file to the external system may be performed by sending the file to the external system. Hence, the computer file may be considered as a response file to the request.

The computer file may be a file that is readable by the processor of the external system. For example, the processor of the external system may read the data as a part of the computer file for updating the webpage using the web browser. In one example, the computer file may be an HTML document. The HTML document may comprise the data and the instructions. The instructions may comprise commands of the scripting language "JavaScript". In one example, the instructions may serve for tracking and/or profiling actions being performed on the external system. In one example, the instructions may form a set of instructions for obtaining information about a central processing unit and/or a graphics processing unit of the external system and/or a browser configuration of the web browser of the external system and/or for reading data of a database of the external system. In the latter case, the information about the external system may comprise the data of the database of the external system. Consequently, the information about the external computer system may comprise information about the central processing unit and/or the graphics processing unit of the external system and/or the browser configuration of the web browser of the external system and/or the data of the database of the external system. The information about the central processing unit may indicate that the external system is a high-performance computing machine comprising racks of sets of processors. This information may be used to identify the external system as a suspicious system. Furthermore, the information about the browser configuration of the web browser of the external system may indicate a use of suspicious web browser plug-ins. The information about the external computer system may also comprise a fingerprint of the external system. The fingerprint may be a set of characteristics that may be used for an identification of the external system. The set of characteristics may comprise a browser user agent identification, cookies, an IP-address and/or a user time zone of the external system.

The set of instruction may involve commands, such as: "navigator.userAgent", "window.navigator.hardwareConcurrency", "navigator.buildID", "navigator.clipboard", "navigator.language", and "navigator.mediaDevices". Thus, the information about the external system may be generated by an execution of the set of instructions on the processor of the external system.

The set of instructions may comprise an instruction for initializing a sending of the information about the external system from the external system to the computer system or the proxy server, in the following also referred to as send back instruction. Such instructions may comprise commands, such as: "XMLHttpRequest", "navigator.sendBeacon", "document.body.appendChild(myForm)", "myForm.submit( )", "img.src", and "iframe.src", for example.

In other words, the instructions may be designed such that an execution of the set of instructions may provoke obtaining the information about the external system and sending the information about the external system to the computer system or the proxy server.

The preserving of the information about the external computer system within the computer system may be performed by storing this information in a database, for example, an intruder database. The intruder database may comprise profiles of former external computer systems that have performed attacks against the computer system in the past (hereinafter, also referred to as former external systems).

According to one example, the preserving of the information about the external computer system within the computer system may be performed by training an Artificial-Intelligence-Module (AI-Module) dependent on the information about the external computer system. The training may comprise adapting values of parameters of the AI-Module to the information about the external computer system. According to this example, the information about the external computer system may be preserved in the form of the adapted values of the parameters of the AI-Module. In this case, the information about the external computer system may be provided by generating an output dataset of the AI-Module dependent on an input dataset of the AI-Module and the adapted values of the parameters of the AI-Module.

One feature and advantage of some embodiments may be that the information about the external system may be obtained by actions performed outside the computer system, i.e., on the external system. These actions comprise performing the set of instructions for obtaining the information about the external system. Generally, the instruction may be performed by the processor of the external system. This may reduce the risk that the computer system may be attacked by the external system compared to a method according to which the information about the external system is only obtained on the basis of the requests sent by the external system to the computer system. Furthermore, the sending of the data together with the computer file may create a situation where the instructions may not be discovered as malware by the external system. This effect may be enhanced if the computer file comprises the instructions.

The generating of the computer file in response to categorizing the external computer system as the potential threat may imply that the computer file may not be generated and may not be sent to the external system if the external computer system is not categorized as the potential threat. As a consequence, an amount of data traffic between the computer system and further external systems that may each not be categorized as a potential threat to the computer system may be reduced by performing the categorizing in general. In a case where the categorizing was not performed, the computer file comprising the instructions would typically be sent by default to the further external systems requesting information from the computer system in order to obtain information about the further external systems. This would increase the data traffic between the computer system and the further external systems. In addition to that, the information about the further external systems may not be relevant for protecting the computer system. The further external systems may be computer systems of known users of the computer system.

According to one embodiment, the method may further comprise developing and performing the measure for protecting the computer system dependent on the information about the external computer system. The measure may comprise disconnecting the external system from the computer system in response to performing an analysis of the information about the external system. A controller node of the computer system may perform the analysis of the information about the external system. Performing the analysis may comprise performing a comparison of the information about the external computer system with information given by the intruder database.

According to a further example, the trained AI-Module may be used to recognize future external computer systems as potential threats. Alternatively or in addition, an information of the future external computer system may be compared with the information given by the intruder database for recognizing the future external computer systems as the potential threats. In response to recognizing one of the future external computer systems as a potential threat, the computer system may disconnect that future external computer system. This may be one example of the measure for protecting the computer system dependent on the information about the external computer system.

According to one embodiment, the method may further comprise receiving a series of requests from the external system, wherein the request is the latest request of the series. This embodiment may involve counting a number of the requests of the series and initializing the sending of the data together with the computer file if the number of requests reaches a given threshold. This may provoke a delay between a first request sent from the external system to the computer system and the sending of the computer file to the external system.

In some embodiments, the external system may perform an examination of a first response file. The first response file may be sent from the computer system in the form of a response to the first request. The first request may be sent from the external system to the computer system and may be the first request of the series of the requests. The first response file may not comprise any of the aforementioned instructions. Therefore, the external system may categorize the computer system as inoffensive and may continue sending further requests to the computer system, including the aforementioned request. The computer system may send further response files in response to receiving the further requests, including the aforementioned response file, namely the computer file. In many applications, the external system may not check whether the computer system is inoffensive dependent on the further response files. This may allow initiating the execution of the instructions on the processor of the external system such that this execution may not be detected by the external system.

According to one embodiment, the computer system may comprise a data server providing the data. The connection may be established using the proxy server. According to this embodiment, the method may further comprise:

receiving the request using the proxy server;

directing the request to the data server using the proxy server;
sending the data from the data server to the proxy server dependent on the request;
generating the computer file using the proxy server;
sending the data together with the computer file from the proxy server to the external computer system.

The proxy server may be designed in the form of a server application and may act as an intermediary between the external system and at least a part of the computer system, for example the data server or the decoy server. In one example, the computer system may comprise the proxy server. The proxy server may perform an evaluation of the request and may direct the request to the data server or the decoy server dependent on a result of the evaluation of the request. For example, in a case where the proxy server assesses the request as a completely unknown request, the proxy server may block a sending of the request to the data server or the decoy server. Thus, the proxy server may encapsulate at least a part of the computer system, for example the data server and/or the decoy server, from the external system. Furthermore, the proxy server may mask the origin of the data which is sent to the external system.

The generating of the computer file using the proxy server may have the advantage that only the proxy server may need to be adapted for performing the generation of the computer file. A protected part of the computer system may not need to be adapted in this case.

According to one embodiment, the computer system may comprise a data service. According to this embodiment, the providing of the data dependent on the request may comprise imitating the data service using a decoy module. In some embodiments, the data service may be designed for providing the data that is requested by the request. However, the request may comprise a request for the confidential data, for example the data of the payroll system. The decoy module may be designed to produce the data such that the data may comprise a format of the confidential data and may comprise erroneous values of the confidential data. By that, a risk may be reduced that the data may be detected as "fake data" by the external system. The format may prescribe a number of rows and/or columns of a table, for example a payroll table, in one example.

In some embodiments, the data may be provided by the decoy module, and the method may further comprise establishing the connection using the proxy server, receiving the request using the proxy server and sending the data and the computer file together from the proxy server to the external computer system as mentioned above. According to one variant of this embodiment, the computer file may be generated using the proxy server. Furthermore, the proxy server may comprise the decoy module. Thus, only the proxy server may need to be adapted for producing the data in the form of the "fake data". In one example, the proxy server may comprise a format database. Furthermore, the proxy server may be designed to create the format database dependent on a training set of past requests and a training set of past datafiles comprising data formats. Each request of the training set of the past requests may correspond to one of the data formats of the training set of the past datafiles.

According to one embodiment, the method may further comprise providing the decoy server, wherein the decoy server comprises the decoy module. According to this embodiment, the method may further comprise directing the request from the proxy server to the decoy server and receiving the data from the decoy server using the proxy server. The decoy server and/or the decoy module may be designed such that it comprises a security flaw. For example, the decoy server may comprise a systems software which is not updated. The security flaw may provoke designing the request such that it is directed to the decoy module and/or decoy server. By that, it may prevent the request from being directed to the data server that may store the confidential data.

According to one embodiment, the method may further comprise performing a classification of the external computer system. The classification may be performed dependent on the recorded data traffic between the external system and the computer system, for example, dependent on the request and/or the history of requests. According to a variant of this embodiment, the providing of the data may comprise generating the data dependent on a result of the classification of the external computer system. According to a further variant of this embodiment, the instructions may be generated dependent on the result of the classification of the external computer system. Thus, the data and/or the instructions may be considered as customized data and as customized instructions respectively, wherein the data and/or the instructions are adapted to the external system. This may provoke the external system to keep up the connection to the computer system such that a chance of receiving the information about the external system may be increased. The classification of the external computer system may involve classifying the external system by its region, its pattern of sending the request, or the history of requests.

According to one embodiment, the request may comprise an initial information about the external system. According to this embodiment the computer system may generate the computer file, for example the data and/or the instructions, dependent on the initial information about the external system. Alternatively or in addition, the computer system may generate the data and/or the instructions dependent on the recorded data traffic. The initial information about the external system and/or the recorded data traffic may comprise the IP-address and/or a geolocation data sent from the external system. The request may comprise a header that may comprise information about a user agent of the browser and/or additional information about the browser of the external system, such as acceptable language, the cookies, and/or a referrer.

Thus, in some embodiments, the data and/or the instructions may be considered as customized data and a customized computer file respectively, wherein the data and/or the computer file are adapted to the external system based on the initial information. This may provoke the external system to keep up the connection to the computer system.

According to one embodiment, the categorizing of the external computer system as the potential threat may be performed using a further Artificial-Intelligence-Module (hereinafter also referred to as further AI-Module). Information about the recorded traffic data between the external system and the computer system may be send in the form of input signals to the further AI-Module. The further AI-Module may categorize the external computer system as the potential threat dependent on the information about the traffic data. The AI-Module may comprise a neuronal network and/or a rule-based decision module.

According to one embodiment, the method may further comprise generating a report dependent on the information about the external computer system. The report may be sent to a security manager of the computer system.

Figure 1:
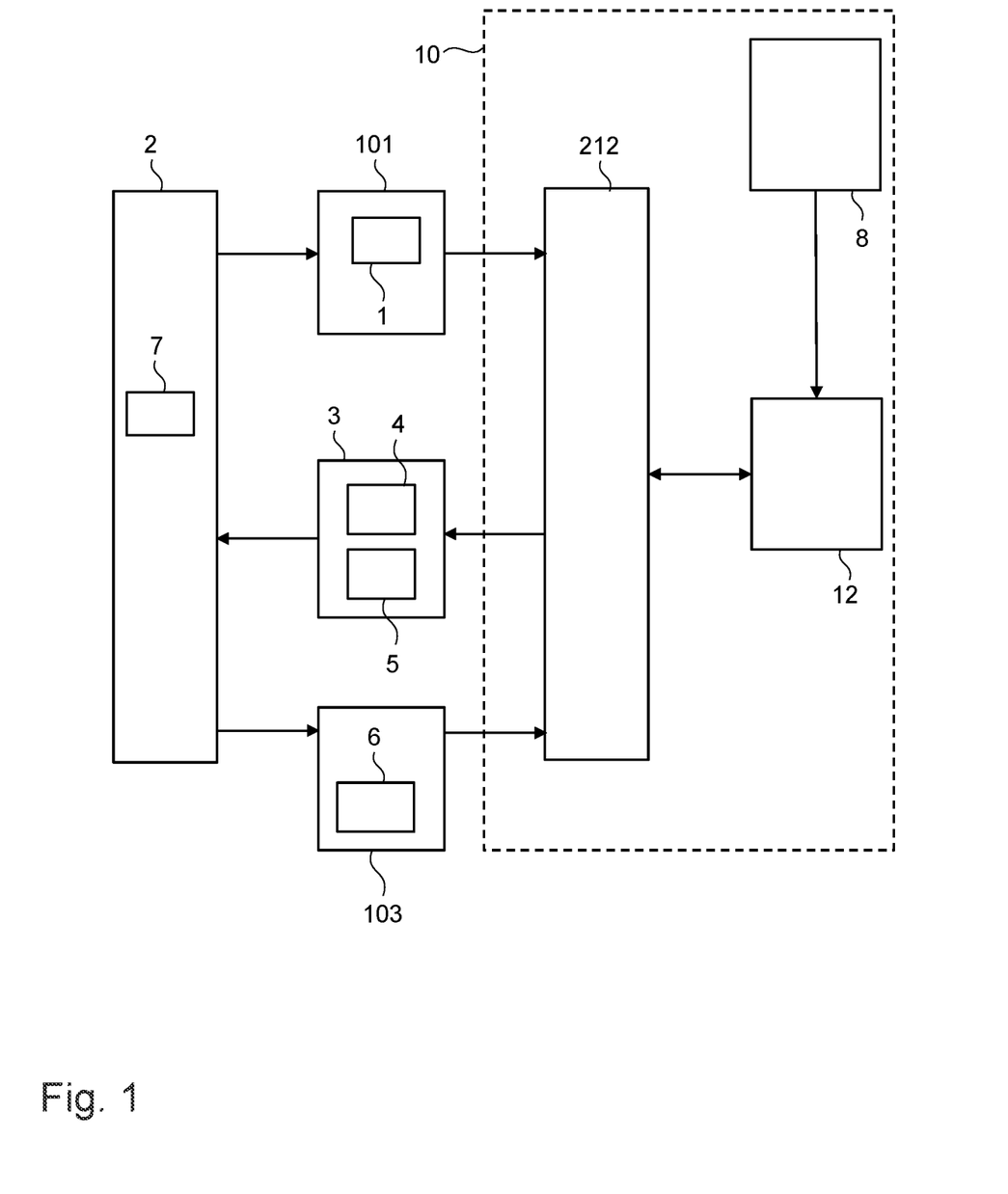
FIG. 1 is a block diagram schematically illustrating a proxy server and a controller server of a computer system according to an example of the present subject matter.

Embodiments of the present disclosure may be implemented using a computing device that may also be referred to as a computer system, a client, or a server. Referring now to FIG. 1, a schematic illustration of an example of a computer system 10 is shown. Computer system 10 is only one example of a suitable computer system and is not intended to suggest any limitation as to the scope of use or functionality of the embodiments described herein. Regardless, computer system 10 is capable of being implemented and/or performing any of the functionality set forth hereinabove.

Figure 2:
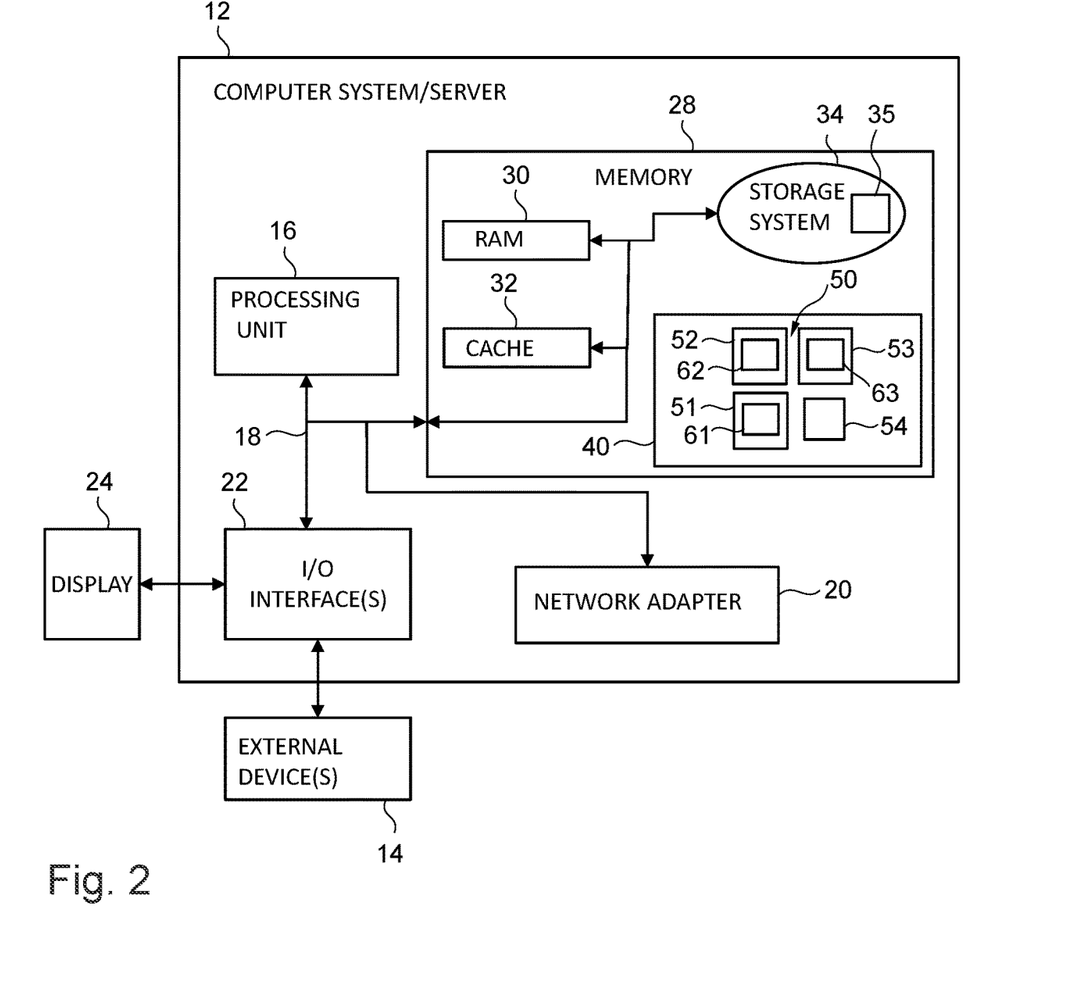
FIG. 2 is a block diagram schematically illustrating components of the controller server shown in FIG. 1.
Figure 3:
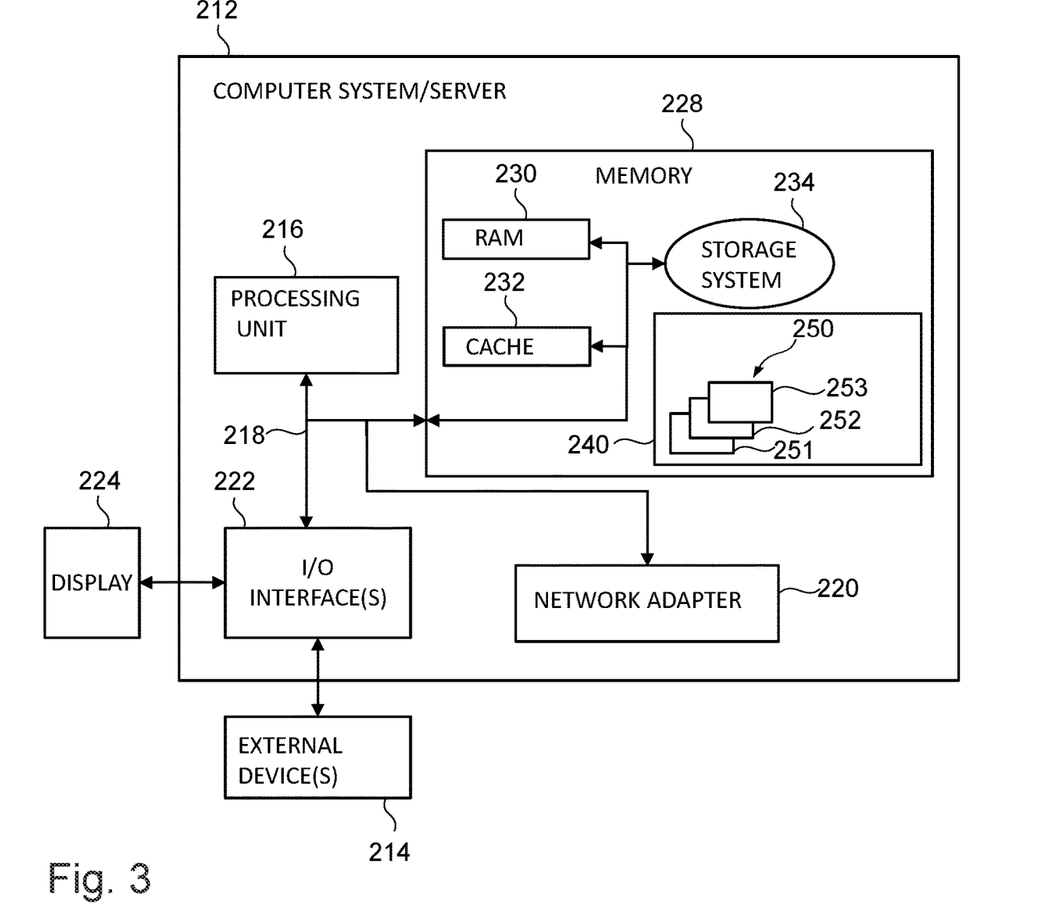
FIG. 3 is a block diagram schematically illustrating components of the proxy server shown in FIG. 1.

The computer system 10 may comprise a controller server in the form of a first computer system/server 12 as shown in FIG. 2 and a proxy server in the form of a second computer system/server 212 as shown in FIG. 3.

The first computer system/server 12 and the second computer system/server 212 may be each operational with numerous other general purpose or special purpose computing system environments or configurations. Examples of computing systems, environments, and/or configurations that may be suitable for use with the first computer system/server 12 and the second computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

The first computer system/server 12 and the second computer system/server 212 may be described in the general context of computer system executable instructions, such as program modules, being executed by a computer system. Generally, program modules may include routines, programs, objects, components, logic, data structures, and so on that perform particular tasks or implement particular abstract data types. The first computer system/server 12 and the second computer system/server 212 may be practiced in distributed computing environments, where tasks may be performed by remote processing devices that are linked through a communications network. In a distributed computing environment, program modules may be located in both local and remote computer system storage media including memory storage devices.

As shown in FIG. 2, the first computer system/server 12 in computer system 10 may be a general-purpose computing device. The components of the first computer system/server 12 may include, but are not limited to, one or more processors or processing unit 16, a system memory 28, and a bus 18 that couples various system components including system memory 28 to processing unit 16. Bus 18 may represent one or more of any of several types of bus structures, including a memory bus or memory controller, a peripheral bus, an accelerated graphics port, and a processor or local bus using any of a variety of bus architectures. By way of example, and not limitation, such architectures may include: Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

First computer system/server 12 may include a variety of computer system readable media. Such media may be any available media that is accessible by first computer system/server 12, and it may include both volatile and non-volatile media, removable and non-removable media.

System memory 28 may include computer system readable media in the form of volatile memory, such as random access memory (RAM) 30 and/or cache memory 32. First computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk (e.g., a CD-ROM, DVD-ROM or other optical media) can be provided. In such instances, some or all may be connected to bus 18 by one or more data media interfaces. As will be further depicted and described below, memory 28 may include at least one program product having a set (e.g., at least one) of program modules that are configured to carry out the functions of some embodiments.

Program/utility 40, having a set (at least one) of program modules 50, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 50 may carry out the functions and/or methodologies of some embodiments as described herein.

First computer system/server 12 may also communicate with one or more external devices 14, such as: a keyboard, a pointing device, a display 24, etc.; one or more devices that enable a user to interact with first computer system/server 12; and/or any devices (e.g., network card, modem, etc.) that enable first computer system/server 12 to communicate with one or more other computing devices. Such communication may occur via Input/Output (I/O) interfaces 22. Still yet, first computer system/server 12 may communicate with one or more networks, such as: a local area network (LAN), a general wide area network (WAN), and/or a public network (e.g., the Internet) via network adapter 20. As depicted, network adapter 20 may communicate with the other components of first computer system/server 12 via bus 18. It should be understood that although not shown, other hardware and/or software components could be used in conjunction with first computer system/server 12. Examples, include, but are not limited to: microcode, device drivers, redundant processing units, external disk drive arrays, RAID systems, tape drives, and data archival storage systems, etc.

As shown in FIG. 3, second computer system/server 212 in computer system 10 may be a general-purpose computing device. The components of second computer system/server 212 may include, but are not limited to, one or more processors or processing unit 216, a system memory 228, and a bus 218 that couples various system components including system memory 228 to processing unit 216. Bus 218 may represent one or more of any of several types of bus structures, including a memory bus or memory controller, a peripheral bus, an accelerated graphics port, and a processor or local bus using any of a variety of bus architectures. By way of example, and not limitation, such architectures may include: Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Second computer system/server 212 may include a variety of computer system readable media. Such media may be any available media that is accessible by second computer system/server 212, and may include both volatile and non-volatile media, and removable and non-removable media.

System memory 228 may include computer system readable media in the form of volatile memory, such as random access memory (RAM) 230 and/or cache 232. Second computer system/server 212 may further include other removable/non-removable, volatile/non-volatile computer system storage media. By way of example only, a storage system 234 may be provided for reading from and writing to a non-removable, non-volatile magnetic or solid-state storage media (e.g., a "hard drive," not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 218 by one or more data media interfaces. As will be further depicted and described below, memory 228 may include at least one program product having a set (e.g., at least one) of program modules that are configured to carry out the functions of embodiments of the disclosure.

Program/utility 240, having a set (at least one) of program modules 250, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 250 generally carry out the functions and/or methodologies of some embodiments described herein.

Second computer system/server 212 may also communicate with one or more external devices 214, such as: a keyboard, a pointing device, a display 224, etc.; one or more devices that enable a user to interact with second computer system/server 212; and/or any devices (e.g., network card, modem, etc.) that enable second computer system/server 212 to communicate with one or more other computing devices. Such communication can occur via Input/Output (I/O) interfaces 222. Still yet, second computer system/server 212 may communicate with one or more networks, such as: a local area network (LAN), a general wide area network (WAN), and/or a public network (e.g., the Internet) via network adapter 220. As depicted, network adapter 220 may communicate with the other components of second computer system/server 212 via bus 218. It should be understood that although not shown, other hardware and/or software components could be used in conjunction with second computer system/server 212. Examples, include, but are not limited to: microcode, device drivers, redundant processing units, external disk drive arrays, RAID systems, tape drives, and data archival storage systems, etc.

A computer system such as the computer system 10 shown in FIG. 1 may be configured to perform operations disclosed herein such as receiving an HTTP-request 1 from an external computer system 2 via a connection between the computer system 10 and the external computer system 2 (hereinafter also referred to as first reception operation); detecting the external computer system 2 as a potential threat to the computer system 10 (hereinafter also referred to as detection operation); generating a computer file 3 dependent on the request 1 (hereinafter also referred to as file generation operation); providing data 4 dependent on the request 1 (hereinafter also referred to as data generation); sending the data 4 together with the computer file 3 to the external computer system 2 (hereinafter also referred to as response operation); receiving information 6 about the external computer system 2 generated dependent on instructions 5 of the computer file 3 (hereinafter also referred to as second reception operation); and preserving the information 6 about the external computer system 2 within the computer system 10 (hereinafter also referred to as preservation operation).

The instructions 5 may be designed for obtaining the information 6 if the instructions 5 are executed on a processor 7 of the external computer system 2.

Figure 4:
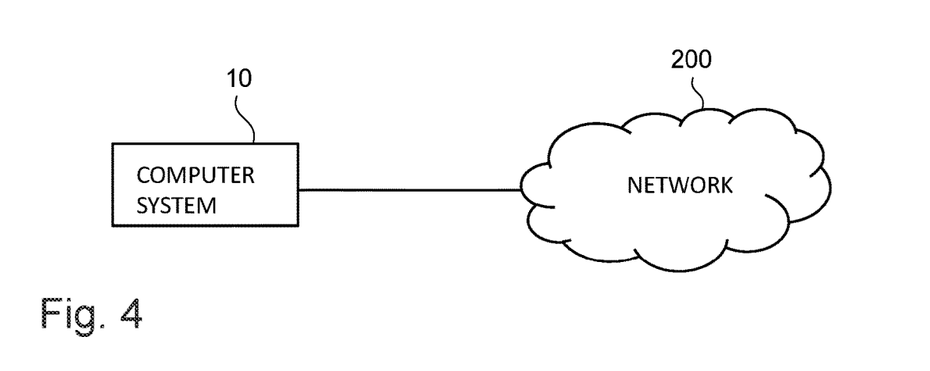
FIG. 4 is a block diagram illustrating a connection between the computer system shown in FIG. 1 and a network.

FIG. 4 shows an example computing environment where a computer system, such as computer system 10, may be connected, e.g., using the network adapter 220, to a network 200. Without limitation, the network 200 may be a communications network such as the internet, a local-area network (LAN), a wireless network such as a mobile communications network, and the like. The network 200 may comprise a computing network such as a cloud-computing network. The computer system 10 may have a connection to the external computer system 2 via the network 200. The computer system 10 may receive data to be processed, such as communication data to build up the connection between the external computer system 2 and the computer system 10 and the request 1, from the network 200. Furthermore, the computer system 10 may provide a computing result, such as the computer file 3, to another computing device connected to the computer system 10 via the network 200, such as the external computer system 2.

The computer system 10 may perform operations described herein, entirely or in part, in response to the request 1 received via the network 200. In particular, the computer system 10 may perform such operations in a distributed computation together with one or more further computer systems that may be connected to the computer system 10 via the network 200. For that purpose, the computing system 10 and/or any further involved computer systems may access further computing resources, such as a dedicated or shared memory, using the network 200.

The proxy server 212 may perform the first reception operation, the response operation and the second reception operation by executing a first reception program module 251, a response program module 252 and a second reception program module 253 respectively on the processing unit 216. Executing the first reception program module 251 on the processing unit 216 may provoke a transmission of a first data package 101 comprising the request 1 in the form of electronic signals from the network adapter 220 to the memory 228, for example into the cache 232. The external computer system 2 may send the request 1 in the form of the first data package 101 to the proxy server 212 via the network 200. The first data package 101 and/or the request 1 may comprise an initial information about the external computer system 2, such as a geolocation information and/or an IP-address of the external computer system 2. Furthermore, executing the first reception program module 251 on the processing unit 216 may provoke sending the request 1 together with the initial information to the I/O interfaces 22 via the I/O interfaces 222. Thus, the proxy server may direct the request 1 together with the initial information to the controller server 12.

Similarly, executing the second reception program module 253 on the processing unit 216 may provoke a transmission of a third data package 103 comprising the information 6 in the form of first further electronic signals from the network adapter 220 to the memory 228, for example into the cache 232, and sending the information 6 to the I/O interfaces 22 via the I/O interfaces 222. Thus, the proxy server may direct the information 6 to the controller server 12. The processing unit 216 may check whether first and the third data package 103 may comply with prescribed security rules stored in the memory 228.

Executing the response program module 253 on the processing unit 216 may provoke sending the computer file 3 from the memory 228, for example from the cache 232, via the network adapter 220 to the network 200 using a second data package comprising an address of the external computer system 2 and the computer file 3.

The controller server 12 may perform the detection operation, the file generation operation, the data generation and the preservation operation by executing a detection program module 51, a file generation program module 52, a data generation program module 53 and a preservation program module 54 respectively on the processing unit 16.

Executing the detection program module 51 may involve computing an output value of an AI-Module 61 of the program module 51 dependent on data of the request 1, including, for example, the initial information. In one example, executing the detection program module 51 may comprise computing an output value of an AI-Module 61 dependent on data of past requests and the request 1. The data of the past requests and the request 1 may be used as input data of the AI-Module 1, in this case. The past requests may be sent by the external computer system 2 or further external systems to the proxy server 212. The output value of the AI-Module 61 may indicate if the external computer system 2, in the following also referred to as external system 2, is categorized as the potential threat or not. For example, an output value of "1" may indicate that the AI-Modul evaluates the external system 2 as the potential threat. If the external system 2 is not evaluated as the potential threat, the output value of the AI-Module 61 may be "0".

The detection program module 51 and/or the AI-Module 61 may be designed to evaluate the external system 2 as the potential threat by detecting a common pattern of the past requests and the request 1 and/or an overall pattern given by the past requests and the request 1. The common pattern may comprise the initial information. In this case, the past requests may each comprise the initial information. In one example, the common pattern may be such that the past requests and the request 1 comprise similar data. The past requests and the request 1 may each comprise a phrase, for example, a password phrase. The similar data may comprise a similar set of characters. For example, the past requests and the request 1 comprising similar data may involve that the phrases of the past requests and the phrase of the request 1 differ respectively from each other only in one or two characters.

The overall pattern may be in the form that the past requests and the request 1 are received by the proxy server 212 within a time interval having a size lower than a given time threshold.

The AI-Module 61 may be in a trained state. The AI-Module 61 may have been trained by presenting a training data set of former HTTP-requests. The former HTTP-requests may be sent from second further external systems known as threats to the computer system 10.

The data of the request 1 may comprise access data for logging into a protected database server 8 of the computer system 10. In one example, the database server 8 may provide a payroll database.

Executing the data generation program module 53 may comprise generating the data 4 using a decoy module 63. The decoy module 63 may be configured to generate the data 4 in the form of modified confidential data of the protected database server 8. The decoy module 63 may generate the data 4 such that the data 4 does not contain any confidential information of the protected database server 8. The data 4 may comprise unclassified, public information, in one example.

In one example, the decoy module 63 may generate the data 4 by imitating functions of the database server 8. For example, the decoy module 63 may generated the data 4 such that the data 4 comprises information about an operating system of the database server 8.

In one example, the decoy module 63 may generated the data 4 such that the data 4 comprises a decoy information. The decoy information may be designed such that the information about the operating system of the database server 8 indicates an expired version of the operating system of the database server 8.

The controller server 12 may be connected to the database server 8 via the I/O interfaces 22 to read the confidential data when executing the data generation program module 53.

The decoy module 63 is illustrated in FIG. 2 as a component of the controller server 12. In an example not shown in the Figures, the decoy module 63 may be a component of a decoy server which may be connected to the controller server 12 via the I/O interfaces 22. Executing the data generation program module 53 may comprise establishing a communication session between the controller server 12 and the decoy server, in this case.

Executing the file generation program module 52 may comprise writing the data 4 and the instructions 5 in the computer file 3. The file generation program module 52 may generate the instructions 5 dependent on the initial information, the data of the request 1 and/or on a result of a classification of the external system 2. A classification module 62 of the file generation program module 52 may perform the classification of the external system 2 dependent on the initial information and/or dependent on the data of the request 1. For example, the instructions 5 may be adapted to a type of an operation system of the external system 2. The file generation program module 52 may determine the type of the operation system of the external system 2 dependent on the result of the classification of the external system 2.

The instructions 5 may comprise a tracking script, a profiling script and/or a script for accessing a database of the external system 2. The tracking script may record information about actions performed on the external system 2, such as processing the data 4 on the external system 2. The processing of the data 4 may involve copying the data 4 one or several times, analyzing the data 4 using a data analyzation tool and storing the data 4 to a persistent storage device of the external system 2. Executing the profiling script on the external system 2 may comprise classifying the actions performed on the external system 2. In one example, executing the profiling script may comprise collecting information about the operation system of the external system 2. Sending the profiling script together with the computer file 3 may have the advantage that a profiling of the external system 2 may be performed by the processor of the external system 2. This may reduce a computational work of the computer system 10. The script for accessing the database of the external system 2 may comprise instructions for reading data of the database of the external system 2. The instructions 5 may be in the form of HTML and/or JavaScript language.

In one example, the instructions 5 may comprise a message generation script. The message generation script may create a message comprising the information 6. The information 6 may comprise information obtained by executing the tracking script, the profiling script, and/or the script for accessing the database of the external system 2 on the processor of the external system 2. The message generation script may generate the message as a part of the third data package 103. The third data package 103 may comprise a further HTTP-request generated by the external system 2. The external system 2 may generate the further HTTP-request in response to reading the decoy information.

The file generation program module 52 is illustrated in FIG. 2 as a component of the controller server 12. In an example not shown in the Figures, the file generation program module 52 may be a component of the proxy server 212, which may be connected to the database server 8 via the I/O interfaces 222. Executing the file generation program module 52 may comprise establishing a communication session between the proxy server 212 and the database server 8, in this case. According to this example, the proxy server 212 may generate the computer file 3.

The controller server 12, for example the processing unit 16, may perform an analysis of the information 6 about the external system 2 in response to receiving the information 6 from the proxy server 212. Performing the analysis of the information 6 may comprise comparing the information 6 with information of an intruder database 35. The intruder database 35 may store various intruder profiles. As the information 6 may comprise more data than the initial information, the information 6 may match one of the intruder profiles stored on the intruder database 35. In this case, the processing unit 16 may initiate a protection measure for protecting the computer system 10. The processing unit 16 may select the protection measure from a set of protection measures dependent on the intruder profile which matches the information 6.

The processing unit 16 may select the protection measure dependent on a part of the information 6, for example a type of a browser plug-in of a web browser used by the external system 2 and/or the IP-address of the external system 2.

In one example, the processing unit 16 may generate a further intruder profile dependent on the information 6. The further intruder profile may be created if the information 6 does not match any of the intruder profiles of the intruder database 35.

In one example, the intruder database 35 may be a further AI-Module which is trained on the basis of the intruder profiles. The intruder profiles may each comprise data having a structure that is similar to a structure of the information 6. The structure of the information 6 may comprise different headers and different text bodies, each corresponding to one of the headers. If the information 6 does not match any of the intruder profiles, the processing unit 16 may update the intruder database 35, for example train the further AI-Module, using the information 6 or the further intruder profile. An updating of the intruder database 35 dependent on the information 6 may be performed by executing the preservation program module 54 on the processing unit 16.

Figure 5:
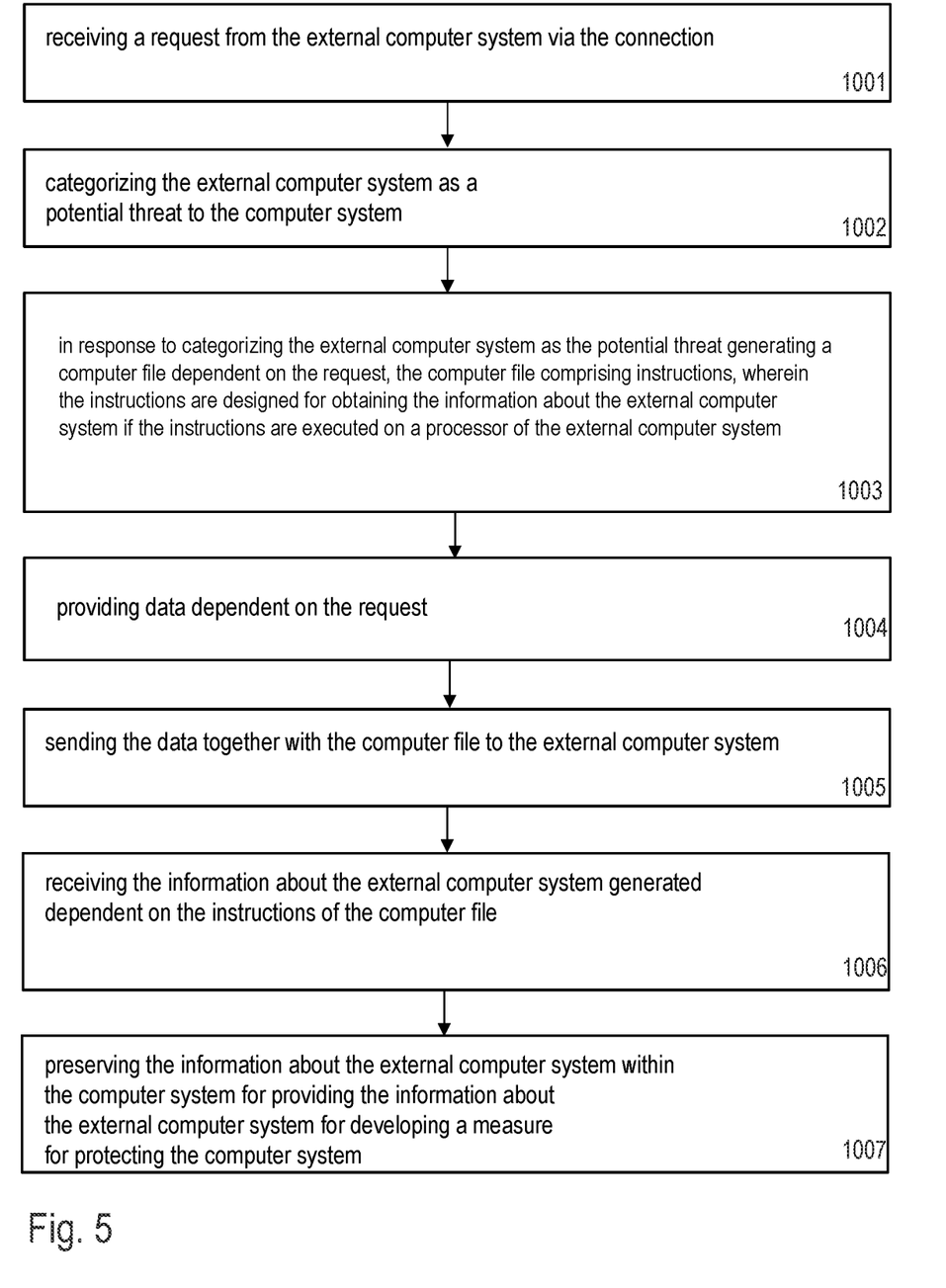
FIG. 5 is a flowchart of a method for obtaining an information about an external system.

FIG. 5 shows a flowchart of a computer-implemented method for obtaining the information 6.

In operation 1001, the proxy server 212 may receive the request 1 from the external system 2, for example in the form of the first data package 101 as described above.

In operation 1002, the controller server 12 may categorize the external computer system 2 as the potential threat to the computer system 10, for example by executing the detection program module 51 as described above.

In operation 1003, the controller server 12 or the proxy server 212 may generate the computer file 3, for example by executing the file generation program module 52 as described above.

In operation 1004, the data 4 may be provided, for example by executing the data generation program module 53 as described above.

In operation 1005, the proxy server 212 may send the data 4 together with the computer file 3 to the external system 2.

In operation 1006, the proxy server 212 may receive the information 6 about the external computer system 2 generated dependent on the instructions 5 of the computer file 6. The processor of the external system 2 may execute the instructions 5 while executing the web browser of the external system 2.

In operation 1007, the controller server 12 may preserve the information 6 about the external computer system 2 within the computer system 10 for providing the information 6 for developing the protection measure for protecting the computer system 10 against the external system 2 or against third further external systems.

The numeration of the operations 1001, 1002, 1003, 1004, 1005, 1006, 1007 does not prescribe an order of execution of these operations. For example, in some embodiments, the data 4 may be provided before the computer file 3 is generated.

Various embodiments are specified in the following numbered clauses:

1. A computer-implemented method for obtaining information about an external computer system having a connection to a computer system, the method comprising:
    receiving a request from the external computer system via the connection;
    categorizing the external computer system as a potential threat to the computer system;
    in response to categorizing the external computer system as the potential threat generating a computer file dependent on the request, the computer file comprising instructions, wherein the instructions are designed for obtaining the information about the external computer system if the instructions are executed on a processor of the external computer system;
    providing data dependent on the request;
    sending the data together with the computer file to the external computer system;
    receiving the information about the external computer system generated dependent on the instructions of the computer file;
    preserving the information about the external computer system within the computer system for providing the information about the external computer system for developing a measure for protecting the computer system.

2. The method of clause 1, wherein the computer system comprises a data server providing the data, the connection being established by means of a proxy server, the method further comprising:
    receiving the request by means of the proxy server;
    directing the request to the data server by means of the proxy server;
    sending the data from the data server to the proxy server dependent on the request;
    generating the computer file by means of the proxy server;
    sending the data together with the computer file from the proxy server to the external computer system.

3. The method of clause 1 or 2, wherein the computer system comprises a data service, the providing of the data dependent on the request comprising imitating the data service by means of a decoy module.

4. The method of clause 3, the method further comprising:
    establishing the connection by means of a proxy server;

receiving the request by means of the proxy server;
sending the data and the computer file together from the proxy server to the external computer system.

5. The method of clause 4, wherein the computer file is generated by means of the proxy server.

6. The method of any of the previous clauses 2-5, the method further comprising providing a decoy server, wherein the decoy server comprises the decoy module, the method further comprising directing the request from a proxy server to the decoy server and receiving the data from the decoy server by means of the proxy server.

7. The method of any of the previous clauses, the method further comprising receiving a series of requests from the external system, wherein the request is the latest request of the series.

8. The method of any of the previous clauses, wherein the request comprises an initial information about the external computer system and the computer file is generated dependent on the initial information about the external computer system.

9. The method of any of the previous clauses, the method further comprising performing a classification of the external computer system, the providing of the data comprising generating the data dependent on a result of the classification of the external computer system.

10. The method of any of the previous clauses, the method further comprising performing a classification of the external computer system, wherein the instructions are generated dependent on a result of the classification of the external computer system.

11. The method of any of the previous clauses, wherein the categorizing of the external computer system as the potential threat is performed by means of an Artificial-Intelligence-Module (AI-Module).

12. The method of clause 11, wherein the AI-Module comprises a neuronal network.

13. The method of clause 11, wherein the AI-Module comprises a rule-based decision module.

14. The method of any of the previous clauses, wherein the information about the external computer system comprises information about a browser configuration of the external computer system.

15. The method of any of the previous clauses, wherein the information about the external computer system comprises information about a central processing unit of the external computer system.

16. The method of any of the previous clauses, wherein the information about the external computer system comprises information about a graphics processing unit of the external computer system.

17. The method of any of the previous clauses, wherein the information about the external computer system comprises data of a database of the external computer system.

18. The method of any of the previous clauses, the method further comprising developing and performing the measure for protecting the computer system dependent on the information about the external computer system.

19. A computer program product for obtaining information about an external computer system having a connection to a computer system, the computer program product comprising one or more computer-readable storage media, and program instructions collectively stored on the one or more computer-readable storage media, the program instructions comprising:
program instructions to receive a request from the external computer system via the connection;
program instructions to categorize the external computer system as a potential threat to the computer system dependent on the request;
program instructions to generate a computer file dependent on the request in response to categorizing the external computer system as the potential threat, the computer file comprising instructions, wherein the instructions are designed for obtaining the information about the external computer system if the instructions are executed on a processor of the external computer system;
program instructions to provide data dependent on the request;
program instructions to send the data together with the computer file to the external computer system;
program instructions to receive the information about the external computer system generated dependent on the instructions of the computer file;
program instructions to store the information about the external computer system in a database for providing the information about the external computer system for developing a measure for protecting the computer system.

20. A computer system for obtaining information about an external computer system having a connection to the computer system, the computer system being configured for:
receiving a request from the external computer system via the connection;
categorizing the external computer system as a potential threat to the computer system dependent on the request;
in response to categorizing the external computer system as the potential threat generating a computer file dependent on the request, the computer file comprising instructions, wherein the instructions are designed for obtaining the information about the external computer system if the instructions are executed on a processor of the external computer system;
providing data dependent on the request;
sending the data together with the computer file to the external computer system;
receiving the information about the external computer system generated dependent on the instructions of the computer file;
storing the information about the external computer system in a database for providing the information about the external computer system for developing a measure for protecting the computer system.

Embodiments of the disclosure may be a system, a method, and/or a computer program product. The computer program product may include a computer readable storage medium (or media) having computer readable program instructions thereon for causing a processor to carry out aspects of the disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device may receive computer readable program instructions from the network and forwards the computer readable program instructions for storage in a computer readable storage medium within the respective computing/processing device.

Computer readable program instructions for carrying out some operations in some embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of some embodiments.

Aspects of the present disclosure are described herein with reference to flowchart illustrations and/or block diagrams of methods, apparatus (systems), and computer program products according to some embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which may execute via the processor of the computer or other programmable data processing apparatus, to implement the functions/acts/operations specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions that implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions, which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Therefore, it is desired that the embodiments described herein be considered in all respects as illustrative, not restrictive, and that reference be made to the appended claims for determining the scope of the invention.

The invention claimed is:

1. A computer-implemented method for obtaining information about an external computer system having a connection to a computer system, the method comprising:
   receiving a series of requests from the external computer system via a network connection, wherein the series of requests comprises initial information about the external computer system;
   categorizing the external computer system as a potential threat to the computer system using the series of requests;
   in response to a number of received requests from the external computer system categorized as the potential threat exceeding a threshold, generating a computer file, the computer file comprising instructions, wherein the instructions are dynamically generated based on real-time analysis of the external computer system's request patterns and designed for obtaining the information about the external computer system if the instructions are executed on a processor of the external computer system, and wherein the instructions designed for obtaining the information about the external computer system are adapted based on the initial information;

providing data responsive to the series of requests;
sending the data in an initial response without the computer file to the external computer system to cause the external computer system to categorize the computer system as inoffensive and continue sending further requests to the computer system;
sending the data together with the computer file in subsequent responses to the external computer system;
receiving the information about the external computer system generated responsive to the instructions of the computer file;
utilizing an Artificial-Intelligence-Module (AI-module) trained on historic data about malicious traffic that analyzes real-time request data to generate context-specific responses, enhancing ability to identify malicious behaviors;
preserving the information about the external computer system within the computer system by storing the information in an intruder database wherein entries in the intruder database comprise profiles including past attack patterns of former external computing systems;
comparing information about a new external computer system, by the trained AI-module, to the information in the intruder database and adding information about the new external computer system to the intruder database when the new external computer system is classified as a potential threat by the trained AI-module; and
performing a protection measure against the new external computer system.

2. The method of claim 1, wherein the computer system comprises a data server providing the data, the network connection being established using a proxy server, the method further comprising:
receiving the series of requests using the proxy server;
directing the series of requests to the data server using the proxy server;
sending the data from the data server to the proxy server responsive to the series of requests;
generating the computer file using the proxy server; and
sending the data together with the computer file from the proxy server to the external computer system.

3. The method of claim 1, wherein the computer system comprises a data service, the providing of the data responsive to the series of requests comprising imitating the data service using a decoy module and wherein the decoy module further comprises:
generating a customized decoy file containing active tracking instructions configured to extract real-time information about the external computer system's browser configuration, hardware, and network parameters, wherein the customized decoy file is dynamically adapted based on a threat classification of the external computer system.

4. The method of claim 1, wherein the computer system comprises a data service, the providing of the data responsive to the series of requests comprising imitating the data service using a decoy module, the method further comprising:
establishing the network connection using a proxy server;
receiving the series of requests using the proxy server; and
sending the data and the computer file together from the proxy server to the external computer system.

5. The method of claim 4, wherein the computer file is generated using the proxy server and further comprises:
generating decoy data files using a template-based approach, wherein decoy files are customized to mimic sensitive data formats and include embedded tracking instructions for collecting detailed information about the external computer system's hardware and software configuration.

6. The method of claim 3, the method further comprising providing a decoy server, wherein the decoy server comprises the decoy module, the method further comprising directing the series of requests from a proxy server to the decoy server and receiving erroneous data from the decoy server at the proxy server.

7. The method of claim 1 further comprising:
classifying the external computer system using the initial information; and
customizing the computer file responsive to a result of classification of the external computer system.

8. The method of claim 7, the method further comprising customizing the provided data responsive to the result of the classification of the external computer system.

9. The method of claim 7, the method further comprising customizing the instructions responsive to the result of the classification of the external computer system.

10. The method of claim 1, wherein the categorizing of the external computer system as the potential threat is performed using the_AI-Module.

11. The method of claim 10, wherein the AI-Module comprises a neural network.

12. The method of claim 10, wherein the AI-Module comprises a rule-based decision module.

13. The method of claim 1, wherein the information about the external computer system comprises information about a browser configuration of the external computer system.

14. The method of claim 1, wherein the information about the external computer system comprises information about a central processing unit of the external computer system.

15. The method of claim 1, wherein the information about the external computer system comprises information about a graphics processing unit of the external computer system.

16. The method of claim 1, wherein the information about the external computer system comprises data of a database of the external computer system.

17. The method of claim 1, the method further comprising developing and performing a measure for protecting the computer system responsive to the information about the external computer system.

18. A computer program product for an intrusion detection system for a computer system, the computer program product comprising one or more computer-readable storage media, and program instructions collectively stored on the one or more computer-readable storage media, the program instructions comprising:
program instructions to receive a series of requests from an external computer system via a network connection, wherein the series of requests comprises initial information about the external computer system;
program instructions to categorize the external computer system as a potential threat to the computer system using the series of requests;
program instructions to generate a computer file in response to a number of received requests from the external computer system categorized as the potential threat exceeding a threshold, the computer file comprising instructions, wherein the instructions are dynamically generated based on real-time analysis of the external computer system's request patterns and designed for obtaining information about the external computer system if the instructions are executed on a processor of the external computer system, and wherein the instructions designed for obtaining the information about the external computer system are adapted based on the initial information;

program instructions to provide data responsive to the series of requests;

program instructions to send the data in an initial response without the computer file to the external computer system to cause the external computer system to categorize the computer system as inoffensive and continue sending further requests to the computer system;

program instructions to send the data together with the computer file in subsequent responses to the external computer system;

program instructions to receive the information about the external computer system generated responsive to the instructions of the computer file;

program instructions to utilize an Artificial-Intelligence-Module (AI-module) trained on historic data about malicious traffic that analyzes real-time request data to generate context-specific responses, enhancing ability to identify malicious behaviors; and program instructions to store the information about the external computer system in an intruder database wherein entries in the intruder database comprise profiles including past attack patterns of former external computing systems;

program instructions to compare information about a new external computer system, by the trained AI-module, to the information in the intruder database and adding information about the new external computer system to the intruder database when the new external computer system is classified as a potential threat by the trained AI-module; and program instructions to perform a protection measure against the new external computer system.

19. An intrusion detection system for a computer system, the intrusion detection system comprising a processor operably connected to a memory, the memory containing program instructions to, when executed on the processor:

receive a series of requests from an external computer system via a network connection, wherein the series of requests comprises initial information about the external computer system;

categorize the external computer system as a potential threat to the computer system responsive to the series of requests;

in response to a number of received requests from the external computer system categorized as the potential threat exceeding a threshold, generate a computer file, the computer file comprising instructions, wherein the instructions are dynamically generated based on real-time analysis of the external computer system's request patterns and are adapted for obtaining information about the external computer system if the instructions are executed on a processor of the external computer system, and wherein the instructions designed for obtaining the information about the external computer system are adapted based on the initial information;

provide data responsive to the series of requests;

send the data in an initial response without the computer file to the external computer system to cause the external computer system to categorize the computer system as inoffensive and continue sending further requests to the computer system;

sending the data together with the computer file in subsequent responses to the external computer system;

receive the information about the external computer system generated responsive to the instructions of the computer file;

utilize an Artificial-Intelligence-Module (AI-module) trained on historic data about malicious traffic that analyzes real-time request data to generate context-specific responses, enhancing ability to identify malicious behaviors; and store the information about the external computer system in an intruder database wherein entries in the intruder database comprise profiles including past attack patterns of former external computing systems;

compare information about a new external computer system, by the trained AI-module, to the information in the intruder database and add information about the new external computer system to the intruder database when the new external computer system is classified as a potential threat by the trained AI-module; and perform a protection measure against the new external computer system.

20. The method of claim 10, further comprising adapting values of parameters of the AI-module in response to the information about the external computer system.

* * * * *